C. M. WILKINS.

Cheese Vat.

No. 1,438. Reissued March 17, 1863.

Witnesses:

Sela C. Merrell

H. C. Mason

Inventor:

C. M. Wilkins

N. PETERS, Photo-Lithographer, Washington, D. C.

UNITED STATES PATENT OFFICE.

C. M. WILKINS, OF WEST ANDOVER, OHIO.

IMPROVEMENT IN CHEESE-VATS.

Specification forming part of Letters Patent No. 26,222, dated November 22, 1859; Reissue No. 1,248 dated December 24, 1861; Reissue No. 1,438, dated March 17, 1863.

*To all whom it may concern:*

Be it known that I, C. M. WILKINS, of West Andover, in the county of Ashtabula and State of Ohio, have invented new and useful Improvements in Cheese-Vats; and I do hereby declare that the following is a full, clear, and exact description of the construction and operation of the same, reference being had to the annexed drawings, making a part of this specification, in which—

Figure 2:
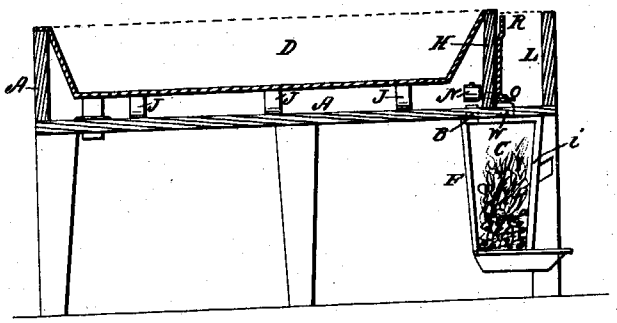
Figure 4:
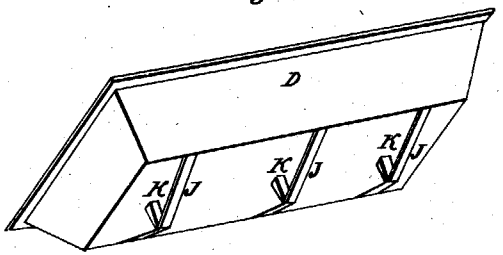
Figure 3:
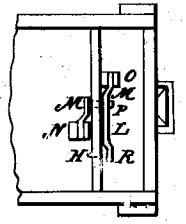
Figure 1:
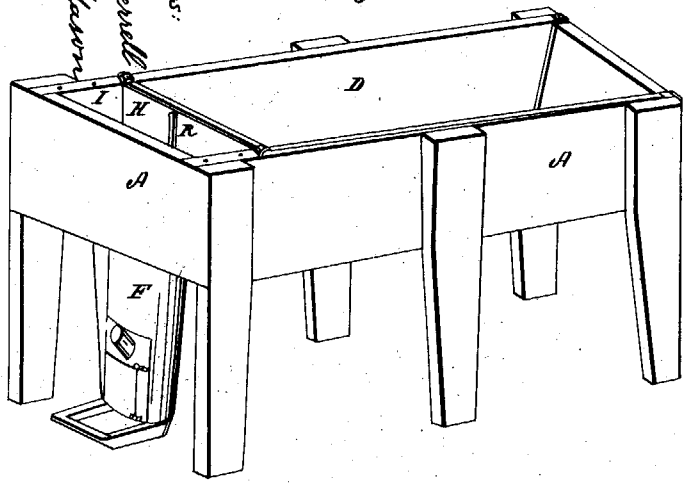

Figure 1 is a perspective view; Fig. 2, a longitudinal section. Figs. 3 and 4 are sections which will be referred to in description.

My improvement in cheese-vats consists in part in the arrangement for regulating the supply of heat from a circulating water-heater to a cheese-vat.

Like letters denote like parts in the several views.

The water-vat A and milk-vat D are made and combined in the usual way, except the water-vat is extended a little, which, after putting in the partition H at the termination of the milk-vat, forms the reservoir or water-chamber L. The heater F is placed under the partition H or division between the water-vat and the reservoir L, and extends each way under the water,vat and reservoir. The heater is made after a style very common. It is composed of two cylinders, *i* and *a*, one within the other, with a cap or head on one end of each. The other ends are joined together, leaving a space between the cylinders and heads for water. There is an opening through both cylinders on one side for a door and smoke-pipe. The cylinder *i* constitutes the fire-box of the heater. There is a pipe, B, connecting the water-chamber of the heater with that of the vat, and a pipe, W, connecting the heater with the chamber L in like manner. In connection with the pipes B and W are arranged two valves, N and O, Figs. 2 and 3. These valves are attached to the shaft P by the arms M M, Fig. 3. This shaft passes through the partition H. To the shaft is also attached the lever R. The valves are so arranged that when one is closed the other is open. By the action of the lever R the valves are operated so as to open or close either of the pipes B and W, or they may both be open at once. By the action of the lever the valve N, Figs. 2 and 3, may be so moved as to close the opening in the pipe B, which will exclude the passage of water through that pipe and allow the surplus heat from the heater to pass off through the pipe W.

Some of the advantages of my vat over others are providing the heater with the pipe W, the office of which is to allow all surplus heat to escape in that direction, while the circulation of water is excluded in the pipe B by shutting the valve N.

The arrangement of the heater under both the vat and reservoir, the combination of valves with the pipes B and W, connecting with their respective water-chambers directly over the heater, is of great advantage in manufacturing and for durability.

By the use of the valves in the manner substantially as shown and described the connecting-pipes from the heater to the vat and reservoir may be short and thoroughly protected from injury, beside getting all of the parts for regulating the supply of heat from the heater to the vat into a very small space.

My improvement in cheese-vats consists, further, in providing the bottom of an ordinary milk-vat with truss-braces, designated by the letters J J J, which extend across the bottom of the vat from one side to the other, and about in the center of the trusses, and connected with them and the bottom of the vat, is a brace, K, Fig. 4, which gives additional strength to the trusses. By means of these truss-braces the bottom or floor of the vat is very much strengthened.

It is found in practice that the milk, &c., in the vat causes the floor of it to bulge and sink down, and a preponderance of pressure by water from below forces up the floor of the vat. Thus the floor of the vat is forced up or down, according to the pressure above or below.

The milk-vat is necessarily made of very light material, usually of sheet-tin. When it is filled with milk there is a great strain upon the seams or joints in the bottom of the vat. By placing these braces upon the bottom of the vat and upon the seams it prevents all working, as above stated, and is capable of sustaining all the pressure that is likely to be brought against it from above or below, which is not the case with any other appliance that I have known used. One or more of the braces K may be used, as the case may seem to require.

I am aware that Reddington and McClure have patented a device for regulating the supply of hot water from the heater to the vat, &c. I therefore disclaim the devices shown in the invention of Reddington and McClure.

What I claim, and wish to secure by Letters Patent, is—

1. The combination of the pipe W with the heater F, substantially as and for the purpose specified.

2. The combination of the valve O with the pipe W, for the purpose set forth.

3. The combination of the valve N with the pipe B, over the fire-box C of the heater, substantially as and for the purpose specified.

4. Arranging the valves N and O to operate substantially as described, and for the purpose specified.

5. Arranging the heater F, as relating to the water-vat A and reservoir L, substantially as shown, and for reasons specified.

6. I claim the use of the truss-braces J J J in the manner and for the purpose described and shown.

C. M. WILKINS.

Witnesses:
J. B. RICE,
SELA C. MERRELL.